(12) United States Patent
Baur et al.

(10) Patent No.: US 9,982,609 B2
(45) Date of Patent: May 29, 2018

(54) METHOD FOR CONTROLLING AN INTERNAL COMBUSTION ENGINE

(71) Applicant: Dr. Ing. h. c. F. Porsche Aktiengesellschaft, Stuttgart (DE)

(72) Inventors: Peter Baur, Moensheim (DE); Moritz Martiny, Karlsruhe (DE)

(73) Assignee: DR. ING. H. C. F. PORSCHE AKTIENGESELLSCHAFT, Stuttgart (DE)

( * ) Notice: Subject to any disclaimer, the term of this patent is extended or adjusted under 35 U.S.C. 154(b) by 720 days.

(21) Appl. No.: 14/543,958

(22) Filed: Nov. 18, 2014

(65) Prior Publication Data

US 2015/0149065 A1    May 28, 2015

(30) Foreign Application Priority Data

Nov. 25, 2013  (DE) .................. 10 2013 112 969

(51) Int. Cl.
*F02D 41/02* (2006.01)
*F02D 29/02* (2006.01)
(Continued)

(52) U.S. Cl.
CPC ............ *F02D 29/02* (2013.01); *B60W 10/02* (2013.01); *B60W 10/06* (2013.01); *B60W 30/1846* (2013.01); *F02D 41/0215* (2013.01); *B60W 2510/1025* (2013.01); *B60W 2510/1095* (2013.01); *B60W 2530/10* (2013.01); *B60W 2710/0666* (2013.01); *F02D 41/10* (2013.01); *F02D 2250/26* (2013.01)

(58) Field of Classification Search
None
See application file for complete search history.

(56) References Cited

U.S. PATENT DOCUMENTS 5,186,081 A * 2/1993 Richardson ........... F02B 33/446
                                                    123/383
6,988,974 B2 * 1/2006 Kobayashi ............. B60K 6/485
                                                    477/3
(Continued)

FOREIGN PATENT DOCUMENTS

DE    102005004224 A1    8/2006
DE    102008046849 A1    3/2010
(Continued)

*Primary Examiner* — Erin D Bishop
(74) *Attorney, Agent, or Firm* — Leydig, Voit & Mayer, Ltd.

(57) ABSTRACT

A method controls an internal combustion engine that has a drive output shaft connected to an input shaft of a transmission. The internal combustion engine, the transmission and a drive wheel are encompassed by a drivetrain for the drive of a motor vehicle. The method includes determining a rotational acceleration of the input shaft and determining an input torque at the input shaft of the transmission based on a product of the rotational acceleration and a speed reduction ratio-dependent moment of inertia of the drivetrain in a section between the input shaft and the drive wheel. A combustion torque of the internal combustion engine is controlled such that the input torque adheres to a predetermined maximum input torque at the input shaft of the transmission.

11 Claims, 2 Drawing Sheets

(51) Int. Cl.
  B60W 10/02 (2006.01)
  B60W 10/06 (2006.01)
  B60W 30/184 (2012.01)
  F02D 41/10 (2006.01)

(56) References Cited

U.S. PATENT DOCUMENTS 9,031,766 B2 * 5/2015 DeLaSalle ............ B60W 10/06
 123/492
2013/0179019 A1 7/2013 Morimoto

FOREIGN PATENT DOCUMENTS

DE 102013200175 A1 7/2013
EP 1439087 A2 7/2004

\* cited by examiner

METHOD FOR CONTROLLING AN INTERNAL COMBUSTION ENGINE

CROSS REFERENCE TO RELATED APPLICATIONS

Priority is claimed to German Patent Application No. DE 10 2013 112 969.2, filed on Nov. 25, 2013, the entire disclosure of which is hereby incorporated by reference herein.

FIELD

The invention relates to a method for controlling an internal combustion engine, in which method a predetermined maximum input torque is adhered to at a transmission connected downstream.

BACKGROUND

As part of the continuous improvement of a motor vehicle, it is sought to make drive components of the motor vehicle as small and lightweight as possible. In order that a drive component nevertheless still exhibits adequate strength, it is normally optimized for a predetermined loading. Advanced methods for component dimensioning make it possible for the elements of the drive component to be calibrated precisely for a predetermined load configuration. In this way, the drive components can perform their function without problems even over relatively long periods of time, and can at the same time be small and lightweight. The driving performance of the motor vehicle can be improved in this way. A level of wear resistance of the component can be adapted for a predetermined service life.

This approach makes it possible for the drive components to be coordinated precisely with one another. However, if one of the components is changed, for example by virtue of an internal combustion engine for the drive of the motor vehicle being modified in terms of its power characteristic, its maximum torque or its maximum rotational speed, this may make it necessary for drive components that are connected to the internal combustion engine, such as for example a transmission or a clutch, to be redesigned, reconstructed or retested. Such an adaptation involves high numbers of personnel, high outlay in terms of costs and time, and a certain amount of risk.

To reduce this additional outlay, it is normally the case that, at least in a low gear with a high speed reduction ratio, the torque of the internal combustion engine is reduced in order to restrict the torque in the rest of the drivetrain of the motor vehicle. Said reduction is normally performed to a predetermined, fixed value. Owing to the fixed torque limitation, however, the driving performance of the motor vehicle can be adversely affected.

DE 10 2013 200 175 A1 presents a drive power output device for a motor vehicle. An engine and multiple motor-generators are connected to one another in non-positively locking fashion. If a torque of one of the motor-generators is restricted, the torque of the other motor-generator is corrected such that a change in the torque at the engine or at a downstream assembly is restricted.

DE 10 2008 046 849 A1 relates to a technique for controlling an internal combustion engine of a drivetrain of a motor vehicle. During a gearshift process in a transmission, a drive-imparting internal combustion engine is controlled by means of a target rotational speed regulator with a two-stage setpoint rotational speed profile.

SUMMARY

In an embodiment, the present invention provides a method for controlling an internal combustion engine that has a drive output shaft connected to an input shaft of a transmission. The internal combustion engine, the transmission and a drive wheel are encompassed by a drivetrain for the drive of a motor vehicle. The method includes determining a rotational acceleration of the input shaft and determining an input torque at the input shaft of the transmission based on a product of the rotational acceleration and a speed reduction ratio-dependent moment of inertia of the drivetrain in a section between the input shaft and the drive wheel. A combustion torque of the internal combustion engine is controlled such that the input torque adheres to a predetermined maximum input torque at the input shaft of the transmission.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
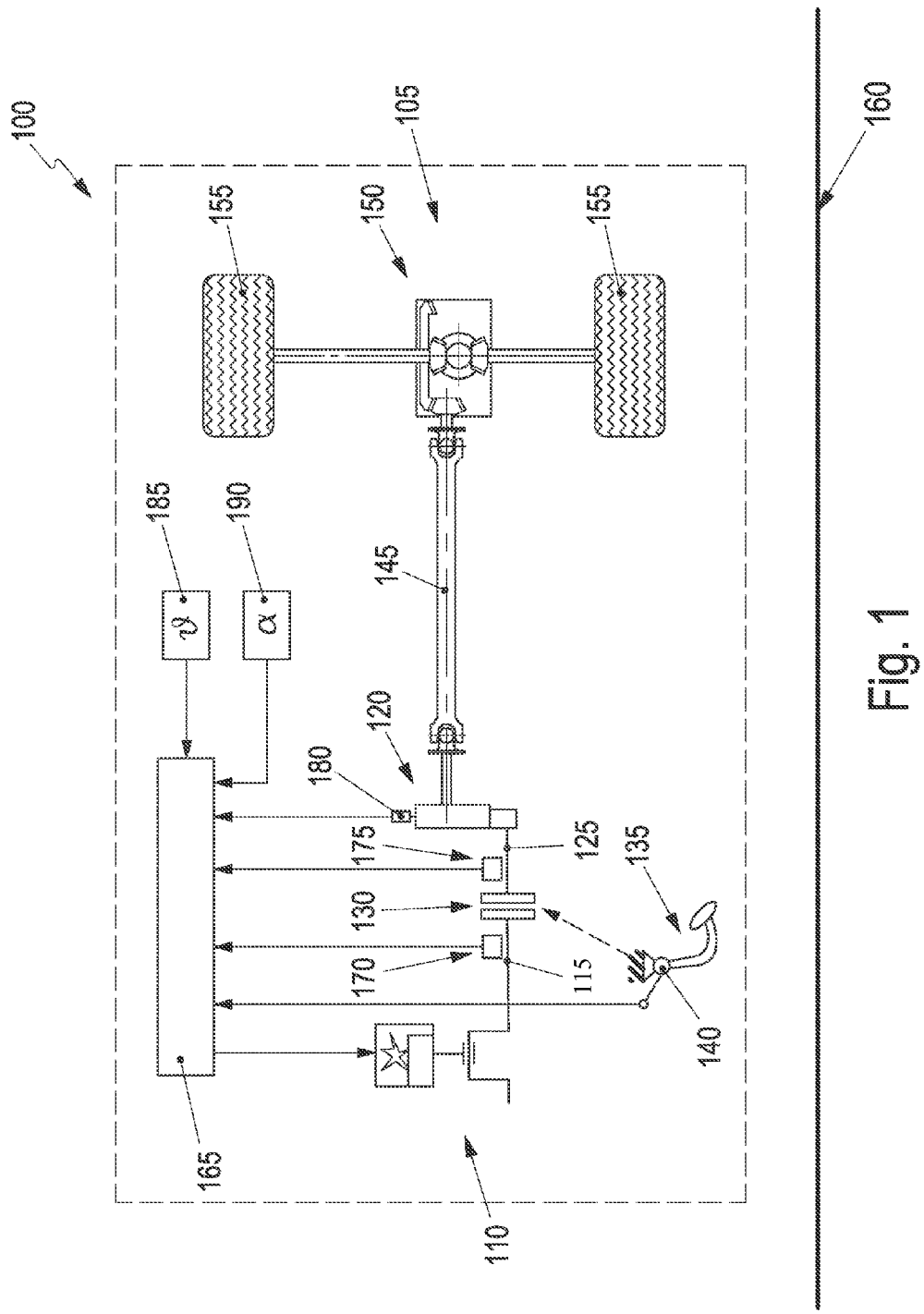
FIG. 1 shows a motor vehicle having a drivetrain.

An aspect of the present invention provides, in a drivetrain for the drive of a motor vehicle, the control of a drive engine for the drive of a transmission such that the transmission is not overloaded, while at the same time, use can be made of as far as possible unhindered power delivery of the internal combustion engine for driving the motor vehicle.

A motor vehicle comprises a drivetrain having an internal combustion engine, having a transmission and having a drive wheel. Here, a drive output shaft of the internal combustion engine is connected to an input shaft of the transmission. A method according to the invention comprises the steps of determining a rotational acceleration of the input shaft, determining an input torque at the input shaft of the transmission based on a product of the rotational acceleration and a gear-dependent, rotationally acting moment of inertia of the drivetrain in a section between the input shaft and the drive wheel, and controlling a combustion torque of the internal combustion engine such that the input torque adheres to a predetermined maximum input torque at the input shaft of the transmission.

To increase the rotational speed of the internal combustion engine, it is necessary for not only for a load connected downstream, such as the drivetrain, but also the rotational motion of the internal combustion engine itself to be accelerated. The torque required for accelerating the rotationally acting inertial mass of the internal combustion engine and/or of the drive output shaft thereof is referred to as dynamic load torque. The combustion torque provided by the internal combustion engine is always provided at the drive output shaft of the internal combustion engine minus the dynamic load torque, such that, depending on the load state of the internal combustion engine, a variable fraction of the combustion torque is not made available at the input shaft of the transmission. Through the dynamic determination of the input torque acting at the input shaft of the transmission, it is possible for the combustion torque of the internal combustion engine to be controlled as a function of dynamic processes at the internal combustion engine, in particular as a function of the rotational acceleration thereof, such that the combustion torque is raised to a value higher than the maximum torque at the input shaft of the transmission.

In relation to a static restriction of the combustion torque, it is ultimately possible in this way for more torque to be made available in the drivetrain without the maximum torque at the input shaft of the transmission being exceeded. The driving behavior of the motor vehicle can be improved in this way. In particular, a critical component of the drivetrain, such as for example a bevel gear, a crown gear, a shaft bearing or a toothing of a gearwheel pair of the transmission, can at the same time be protected more effectively against overloading. The service life of the transmission, and possibly of the rest of the drivetrain, can be lengthened in this way. The described technique can be used for all transmission types (automatic, semi-automatic, dual-clutch transmission), but has proven to be particularly advantageous for a motor vehicle with a transmission whose different gear stages can be selected manually (manually operated transmission).

The moment of inertia encompasses a mass inertia of the motor vehicle and of the components installed in the transmission (such as gearwheels, bearings, shafts etc.). The mass inertia is determined based on a speed reduction ratio expressed by a ratio of a rotational speed of the input shaft to a rotational speed of the drive wheel. The speed reduction ratio may in particular be dependent on a gear stage engaged in the transmission. In this way, the reduced mass inertia acting on the input shaft, as inertia of the motor vehicle, can be determined easily and accurately. The speed reduction ratio may be predefined by the type of the drivetrain, and stored in invariant form.

In one embodiment, the determination of the mass inertia is performed based on an effective wheel diameter of the drive wheel. The effective wheel diameter may vary for example owing to loading of the motor vehicle or properties of the drive wheel, such as rotational speed or wear. Through the determination of the mass inertia based on the effective wheel diameter, the input torque acting at the input shaft of the transmission can be determined with improved accuracy.

The moment of inertia may encompass a mass inertia of the drive wheel. The mass inertia of the drive wheel may likewise be subject to fluctuations, for example if a tire of the drive wheel is exchanged, for example owing to the alternate use of summer tires and winter tires for seasonal reasons.

The transmission may have gearwheels, and the moment of inertia reduced to the transmission input may encompass a mass inertia of the gearwheels. Here, the mass inertias of the rotational motions of the gearwheels are in each case in relation to the input shaft of the transmission. By taking into consideration the moment of inertia of gearwheels or gearwheel pairs that realize a gear stage, a component of the moment of inertia arising in the transmission can be taken into consideration. The input torque acting at the input shaft can thus be determined with greater accuracy.

Based on a gradient of an underlying surface on which the motor vehicle is traveling, it is possible to determine a slope-induced torque, which acts on the transmission, of the motor vehicle. The slope-induced torque can be taken into consideration in the determination of the input torque, wherein the consideration may encompass both a deceleration of the motor vehicle traveling uphill and also an acceleration of the motor vehicle traveling downhill. The input torque required for accelerating the motor vehicle is increased in the first case, and is decreased in the second case.

The output shaft of the internal combustion engine can be coupled by means of a clutch to the input shaft of the transmission, wherein the clutch is at least partially closed. It can be determined in particular that the clutch is in a slipping state in which the drive output shaft of the internal combustion engine and the input shaft of the transmission are at different rotational speeds, and a torque is transmitted between the shafts. In particular, if the internal combustion engine is being operated at a rotational speed at which it can provide a high torque while the input shaft of the transmission is at a lower rotational speed than the drive output shaft, it is possible for the transmission, and possibly the rest of the drivetrain, to be protected against excessive torque.

It is preferably possible for the clutch to be controlled in terms of its opening extent by means of a clutch pedal, wherein a position of the clutch pedal is detected in order to determine whether the clutch is at least partially closed. It is preferably determined that the opening extent of the clutch lies between fully open and fully closed, that is to say the clutch is at least partially slipping such that there is slippage between the input and output sides of the clutch.

to determine input shaft and the output shaft, and to control a combustion torque of the internal combustion engine such that the input torque adheres to a predetermined maximum input torque at the input shaft of the transmission.

According to the invention, the device can be used for protecting the transmission, and possibly further elements of the drivetrain of the motor vehicle, against overloading as a result of an excessively high torque provided by the internal combustion engine.

FIG. 1 shows a motor vehicle 100 having a drivetrain 105. The drivetrain 105 comprises at least one internal combustion engine 110 with a drive output shaft 115, a transmission 120 with an input shaft 125, and a drive wheel 155, wherein the drive output shaft 115 is connected to the input shaft 125. The shafts 115, 125 are coupled rigidly or optionally by means of a clutch 130 that can be at least partially opened by means of a clutch pedal 135, a controllable actuator or some other device. A clutch switch 140 is preferably provided which is connected to the clutch pedal 135 and which serves for providing a signal that indicates whether or not the clutch 130 is fully closed.

The drivetrain 105 may also comprise further components. In particular, a Cardan shaft 145 or a differential 150 may be arranged at the output side of the transmission 120 for the purpose of coupling to the at least one drive wheel 155. The at least one drive wheel 155 is, at its outer circumference, connected in non-positively locking fashion to a road 160 in the usual way, such that the motor vehicle 100 can be driven by virtue of the internal combustion engine 110 providing a combustion torque that is transmitted, as power, via the drivetrain 105 to the road 160.

The internal combustion engine 160 is preferably controlled by means of a control device 165. The combustion torque that is provided is furthermore preferably controlled by the control device 165 by virtue of actuators being used for example to control a flow rate of an injected fuel, a flow rate of combustion air supplied, an ignition time, or an inlet or outlet time at the internal combustion engine 110. The control device 165 normally controls the internal combustion engine 160 as a function of a demand for a torque provided by the internal combustion engine 110. Here, the internal combustion engine 160 is normally controlled such that the demanded torque is made available as rapidly as possible at the drive output shaft 115. The demand may for example be controlled by a driver of the motor vehicle 100. The demand may however also originate from some other component, for example from a control unit for an electronic stability control system, a drive slip regulation system, or some other assistance system on board the motor vehicle 100.

Furthermore, the control device 165 is designed to restrict the combustion torque as a function of at least one dynamic parameter of the drivetrain 105, such that an input torque acting at the input shaft 125 of the transmission 120 does not exceed a predetermined maximum input torque. For this purpose, as will be explained in more detail further below, the control device 165 may access one or more measurement values. In one embodiment, the control device 165 also comprises a memory device for the preferably persistent (=non-volatile) storage of one or more measurement values.

A rotational speed of the drive output shaft 15 can be determined by means of an optional first rotational speed sensor 170, a rotational speed of the input shaft 125 of the transmission 120 can be determined by means of an optional second rotational speed sensor 175, and an engaged gear stage of the transmission 120 can be determined by means of an optional gear selection sensor 180. The transmission 120 preferably comprises multiple gear stages that can be engaged alternatively. The gear stages normally provide different speed reduction ratios between the input shaft 125 and an output shaft, which in this case is connected by way of example to the Cardan shaft 145, of the transmission 120. Furthermore, the control device 165 may be connected to a speed sensor 185 for determining the speed of the motor vehicle 100 or to an interface for connecting to a control device that provides the speed of the motor vehicle 100. Furthermore, an inclination sensor 190 may be provided for determining an inclination, in the direction of travel, of a surface underlying the motor vehicle 100. A rising or falling gradient on which the motor vehicle 100 is traveling can be determined on the basis of a signal from the inclination sensor 190. The inclination sensor 190 preferably encompasses an acceleration sensor for determining a gravitational acceleration acting on the motor vehicle along one or more axes.

Figure 2:
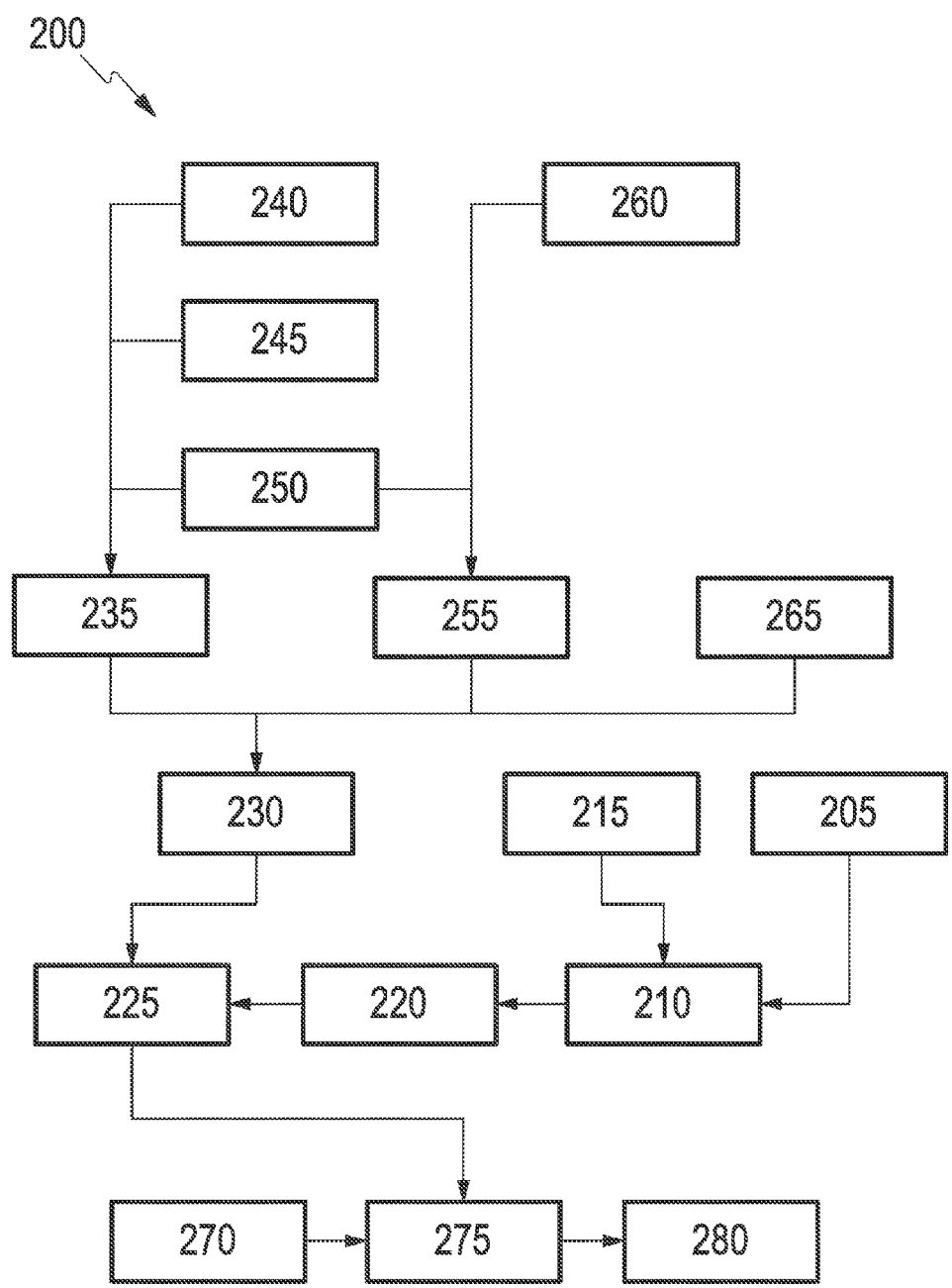
FIG. 2 shows a flow diagram of a method for controlling the internal combustion engine from FIG. 1.

FIG. 2 shows a flow diagram of a method 200 for controlling the internal combustion engine from FIG. 1. The method 200 is in particular configured for being executed on the control device 165. During normal operation of the motor vehicle 100, the clutch 130 is fully closed and the rotational speeds of an input side of the clutch 130, which is connected to the drive output shaft 115 of the internal combustion engine 110, and of an output side of the clutch 130, which is connected to the input shaft 125 of the transmission 120, are equal. Likewise, in this state, rotational accelerations of the input and output sides of the clutch are equal.

In an optional first step 205, it is determined that the clutch 130 is not fully open. A partial opening of the clutch 130 is preferably performed, such that there is slippage between an input side and the output side of the clutch and the rotational speeds of the two sides differ from one another. The determination may be performed in particular on the basis of the signal from the clutch switch 140. In one embodiment, the method 200 may terminate already after the step 205 if the clutch 130 is fully open or fully closed. In yet a further embodiment, the method may also terminate after the step 205 if the clutch 130 is not fully closed.

In a step 210, a rotational speed of the input shaft 125 of the transmission 120 is determined In a modern transmission controller, a corresponding sensor may be used for this purpose, such that the rotational speed can be detected by the sensor or can be obtained, for example via an interface, from the transmission controller.

In another embodiment, it is also possible, in a step 215, for the rotational speed of the input shaft 125 to be determined on the basis of a speed of the motor vehicle 100 and an overall speed reduction ratio. The overall speed reduction ratio expresses the ratio of the rotational speed of the input shaft 125 to the speed of the motor vehicle 100. The overall speed reduction ratio normally encompasses a speed reduction ratio expressed by the ratio of the rotational speed of the input shaft and the rotational speed of the drive wheel 155, and a factor that represents the relationship between the rotational speed of the drive wheel 155 and the speed of the motor vehicle 100. Said factor may in particular be dependent on an effective wheel diameter of the drive wheel 155.

In a subsequent step 220, the rotational acceleration of the input shaft 125 of the transmission 120 is determined, for which purpose the rotational speed determined in step 210 is preferably derived with respect to time. Alternatively, the rotational acceleration of the input shaft 125 may also be determined in some other way, for example by means of a dedicated sensor, or from a further control unit via an interface.

In a further step 225, the input torque of the transmission 120 is determined based on the determined rotational acceleration of the input shaft 125. For this purpose, the rotational acceleration is preferably multiplied by a substitute value that represents the moment of inertia of the motor vehicle 100. The substitute value is a scalar value that replaces the formal parameter of an inertia tensor that is generally used for determining a dynamic torque based on a rotational acceleration.

In one embodiment, in step 245, a rising or falling gradient of an underlying surface on which the motor vehicle 100 is traveling is also taken into consideration. The failing gradient may be determined for example on the basis of a signal from the inclination sensor 190, which may in particular comprise an acceleration sensor for determining a direction and/or a magnitude of gravitational acceleration. In a known manner, it is then possible, on the basis of the mass of the motor vehicle 100 and the gradient, to determine a slope-induced drive output torque that is combined, by addition, with the torque determined on the basis of the substitute value.

The substitute value is determined in a step 230. To determine said substitute value, it is possible for one or more components of the substitute value to be formed, which components are preferably added together.

A first possible component of the substitute value encompasses a mass inertia of the motor vehicle 100, which is determined in a step 235. For this purpose, the mass of the motor vehicle 100 is preferably multiplied by the square of an effective wheel diameter of the drive wheel 155, and divided by the square of a speed reduction ratio, which is determined in step 250. The effective wheel diameter may be predefined as a fixed value or may be determined dynamically, for example by means of a wheel rotational speed sensor, in step 240.

The speed reduction ratio refers to a ratio of the rotational speed of the input shaft 125 of the transmission 120 and the rotational speed of the drive wheel 155. The speed reduction ratio may in particular be predefined as a function of a gear stage that is engaged in the transmission 120, wherein the speed reduction ratio may for example be stored in a memory that is encompassed by the control device 165.

A second possible component of the substitute value encompasses a mass inertia of the drive wheel 155, which can be determined in a step 255. For this purpose, an inertial mass of the drive wheel 155 with respect to the wheel axis is preferably determined in a step 260 and is divided by the square of the speed reduction ratio from step 250.

A third possible component of the substitute value encompasses a mass inertia of gearwheels of the transmission 120, which can be determined in a step 265. Said third component may be dependent on an engaged gear stage. This may encompass all gearwheels and transmission shafts whose rotational motions are coupled to those of the input shaft 125 or of the output shaft of the transmission 120. In the case of a dual-clutch transmission, this may include not only a pair of torque-transmitting gearwheels but also a further gearwheel belonging to a gear stage which, despite being engaged, is separated from the drivetrain 105 by means of its associated clutch. The inertias of the gearwheels are in each case reduced to the input shaft 125.

The determined input torque of the transmission 120 may be used to control the internal combustion engine 110 in terms of its provided combustion torque. For this purpose, a torque that is demanded of the internal combustion engine 110 may be determined in a step 270. The demand may for example be determined from a driver-controlled pedal value or on the basis of a demand from a control unit which implements, for example, a further driving assistance function on board the motor vehicle 100.

A difference between the demanded torque and the torque acting at the input shaft 125 of the transmission 120 is determined in a subsequent step 275. On the basis of the determined difference, a control signal for controlling the combustion torque of the internal combustion engine 110 is generated in a step 280, wherein the control signal is generated such that the combustion torque does not exceed a predetermined input torque at the input shaft 125. In effect, it is possible in this way for the combustion torque to be restricted, wherein the input torque at the input shaft 125 serves as a control variable, such that dynamic effects that increase or reduce the provided combustion torque before it is provided at the drive output shaft 115 are automatically taken into consideration.

In particular, the combustion torque may be influenced by actuation or adjustment of an actuator for the purposes of influencing combustion parameters of the internal combustion engine. The changed combustion torque can, by feedback action, influence the input torque determined in step 230, such that a closed regulating loop can be provided.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling an internal combustion engine of a motor vehicle having a drive output shaft that is connected to an input shaft of a transmission, wherein a drivetrain of the motor vehicle includes the transmission and a drive wheel, the method comprising:
   determining a rotational acceleration of the input shaft;
   determining an input torque at the input shaft of the transmission based on a product of the rotational acceleration of the input shaft and a rotationally acting moment of inertia of the drivetrain; and
   controlling a combustion torque of the internal combustion engine such that the input torque adheres to a predetermined maximum input torque at the input shaft of the transmission,
   wherein the rotationally acting moment of inertia of the drivetrain includes one or more of:
   a mass inertia of the motor vehicle determined based on a mass of the motor vehicle and a ratio of a rotational speed of the input shaft to a rotational speed of the drive wheel, and
   a mass inertia of the drive wheel determined based on a mass of the drive wheel and the ratio of the rotational speed of the input shaft to the rotational speed of the drive wheel.

2. The method as recited in claim 1, wherein the rotational acceleration of the input shaft is determined based on a rotational speed of the input shaft by means of a derivation with respect to time.

3. The method as recited in claim 1, wherein the mass inertia of the motor vehicle is determined based on an effective wheel diameter of the drive wheel.

4. The method as recited in claim 1, wherein the rotationally acting moment of inertia includes the mass inertia of the drive wheel.

5. The method as recited in claim 1, wherein the transmission comprises gearwheels, and wherein the rotationally acting moment of inertia further includes a mass inertia of the gearwheels.

6. The method as recited in claim 1, wherein a slope-induced torque of the motor vehicle, which acts on the transmission, is determined based on a gradient of an underlying surface on which the motor vehicle is traveling.

7. The method as recited in claim 1, wherein the method includes determining that a clutch for coupling the output shaft of the internal combustion engine to the input shaft of the transmission is at least partially closed.

8. The method as recited in claim 3, wherein the rotationally acting moment of inertia further includes a mass inertia of components of the transmission.

9. The method as recited in claim 1, wherein the controlling the combustion torque of the internal combustion engine such that the input torque adheres to the predetermined maximum input torque at the input shaft of the transmission comprises controlling a combustion torque of the internal combustion engine such that the rotational acceleration of the input shaft caused by the combustion torque multiplied by the rotationally acting moment of inertia of the drivetrain is less than the predetermined maximum input torque.

10. The method as recited in claim 1, wherein the mass inertia of the vehicle is determined by multiplying the mass of the motor vehicle by a square of an effective wheel diameter of the drive wheel and divided by a square of the ratio of the rotational speed of the shaft to the rotational speed of the drive wheel.

11. The method as recited in claim 1, wherein the mass inertia of the drive wheel is determined by dividing the inertial mass of the drive wheel with respect to the wheel axis by a square of the ratio of the rotational speed of the input shaft to the rotational speed of the drive wheel.

* * * * *